(12) United States Patent
Wang et al.

(10) Patent No.: US 11,645,803 B2
(45) Date of Patent: May 9, 2023

(54) ANIMATION EFFECT REPRODUCTION

(71) Applicant: International Business Machines Corporation, Armonk, NY (US)

(72) Inventors: Jian Jun Wang, Xi'an (CN); Ting Chen, Beijing (CN); Shi Hui Gui, Shanghai (CN); Li Yi Zhou, Shanghai (CN); Jing Xia, Shanghai (CN); Yidan Lei, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/987,464

(22) Filed: Aug. 7, 2020

(65) Prior Publication Data
US 2022/0044464 A1 Feb. 10, 2022

(51) Int. Cl.
| | |
|---|---|
| *G06T 13/80* | (2011.01) |
| *G06K 9/00* | (2022.01) |
| *G11B 27/031* | (2006.01) |
| *G06V 20/40* | (2022.01) |
| *G06F 3/0482* | (2013.01) |

(52) U.S. Cl.
CPC .............. *G06T 13/80* (2013.01); *G06V 20/46* (2022.01); *G11B 27/031* (2013.01); *G06F 3/0482* (2013.01); *G06T 2200/24* (2013.01)

(58) Field of Classification Search
CPC ......... G06T 13/40; G06T 13/00; G06T 13/80; G06T 13/20; A63F 13/10; A63F 2300/6607
See application file for complete search history.

(56) References Cited

U.S. PATENT DOCUMENTS

| | | | | |
|---|---|---|---|---|
| 6,118,459 A | * | 9/2000 | Hunter | .................... G06T 13/80 345/473 |
| 8,937,620 B1 | * | 1/2015 | Teller | .................. G11B 27/031 345/473 |
| 9,747,495 B2 | | 8/2017 | Corazza | |
| 2006/0117356 A1 | * | 6/2006 | Jojic | ................ H04N 21/44029 725/135 |
| 2009/0309881 A1 | * | 12/2009 | Zhao | ........................ G06T 13/00 345/473 |

(Continued)

FOREIGN PATENT DOCUMENTS

| | | | | |
|---|---|---|---|---|
| EP | | 3633630 A1 * | 4/2020 | ........... G06F 16/164 |
| WO | | 2017195206 A1 | 11/2017 | |

OTHER PUBLICATIONS

Disclosed Anonymously, "Automatic video generation based on machine learning", An IP.com Prior Art Database Technical Disclosure, IP.com No. IPCOM000253268D, IP.com Electronic Publication Date: Mar. 19, 2018, 5 pages.

(Continued)

*Primary Examiner* — Todd Buttram
(74) *Attorney, Agent, or Firm* — Brian M. Restauro

(57) ABSTRACT

According to an embodiment, a source object presented in a source video is identified. Attribute information of the source object in respective frames of a sequence of source frames in the source video is identified. The attribute information represents an animation effect associated with the source object across the sequence of source frames. The attribute information is provided for use in reproducing the animation effect in a target video.

20 Claims, 7 Drawing Sheets

(56) References Cited

U.S. PATENT DOCUMENTS

| | | | |
|---|---|---|---|
| 2014/0002457 A1* | 1/2014 | Swindell | G06T 15/60 |
| | | | 345/426 |
| 2017/0105053 A1 | 4/2017 | Todd | |
| 2018/0117762 A1* | 5/2018 | Earwood | B25J 9/1605 |
| 2019/0066351 A1* | 2/2019 | Noh | G06T 19/20 |
| 2019/0182451 A1 | 6/2019 | Arana | |
| 2021/0049802 A1* | 2/2021 | Luo | G06T 13/80 |
| 2022/0044464 A1* | 2/2022 | Wang | G11B 27/031 |

OTHER PUBLICATIONS

"Duplicate animations with the animation painter", PowerPoint for Microsoft 365 PowerPoint 2019 PowerPoint 2016 PowerPoint 2013 PowerPoint 2010, 3 pages, <https://support.microsoft.com/en-US/office/duplicate-animations-with-the-animation-painter-f2246f1c-87b4-4cb3-81fa-336e538ba8c8>.

Mell et al., "The NIST Definition of Cloud Computing", Recommendations of the National Institute of Standards and Technology, NIST Special Publication 800-145, Sep. 2011, 7 pages.

* cited by examiner

ANIMATION EFFECT REPRODUCTION

BACKGROUND

The present disclosure generally relates to multimedia processing techniques and more particularly, to methods, systems, and computer program products for animation effect reproduction.

An animation effect is a powerful way to attract users' attention in dynamic visual content such as a video. It is possible to animate text, graphics, charts, character elements, and other visual elements with corresponding effects to add interest to the presentation of the dynamic visual content. Animation effects can be achieved through a series of rapidly displayed frames in an animation sequence with the animation effects included for every frame.

SUMMARY OF THE INVENTION

According to one embodiment of the present invention, there is provided a computer-implemented method. According to the method, a source object presented in a source video is identified. Attribute information of the source object in respective frames of a sequence of source frames in the source video is identified. The attribute information represents an animation effect associated with the source object across the sequence of source frames. The attribute information is provided for use in reproducing the animation effect in a target video.

According to a further embodiment of the present invention, there is further provided a computer-implemented method. According to the method, attribute information of a source object presented in a source video is obtained. The attribute information represents an animation effect associated with the source object across a sequence of source frames of the source video. A sequence of target frames are modified by applying the attribute information on a target object in the sequence of target frames, to reproduce the animation effect on the target object across the sequence of target frames. A target video is generated from the sequence of modified target frames.

According to a further embodiment of the present invention, there is provided a system. The system comprises a processing unit and a memory coupled to the processing unit for storing instructions thereon. The instructions, when executed by the processing unit, perform acts of any one of the above methods according to the embodiment of the present invention.

DETAILED DESCRIPTION

Figure 1:
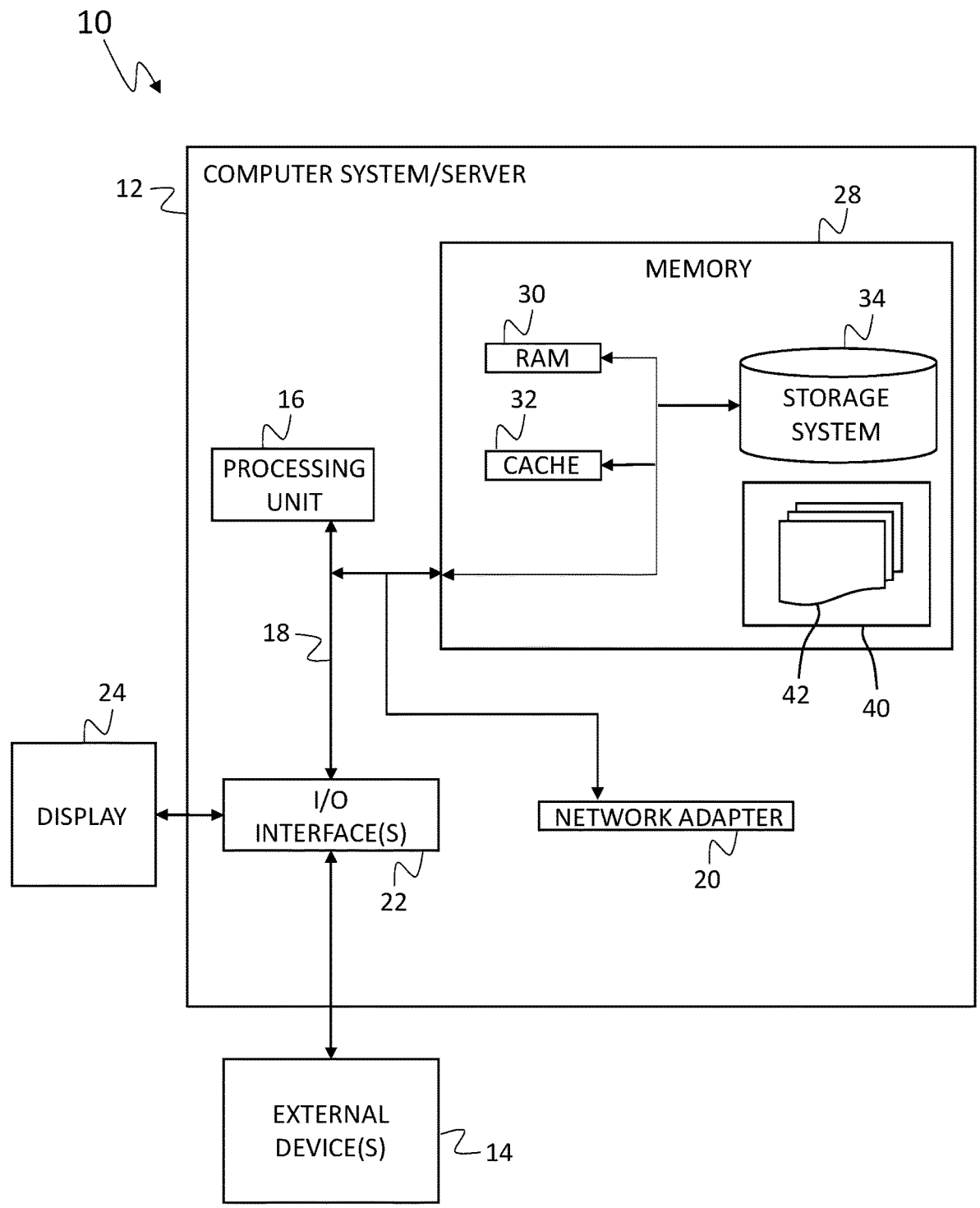
FIG. 1 depicts a cloud computing node, in accordance with an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, processing unit 16, memory 28, and bus 18 that couples various system components including memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data, or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Further, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components may be used in conjunction with computer system/server 12. Examples include, but are not limited to: microcode, device drivers, redundant processing units, external disk drive arrays, RAID (Redundant Array of Inexpensive Disks) systems, tape drives, data archival storage systems, etc.

Figure 2:
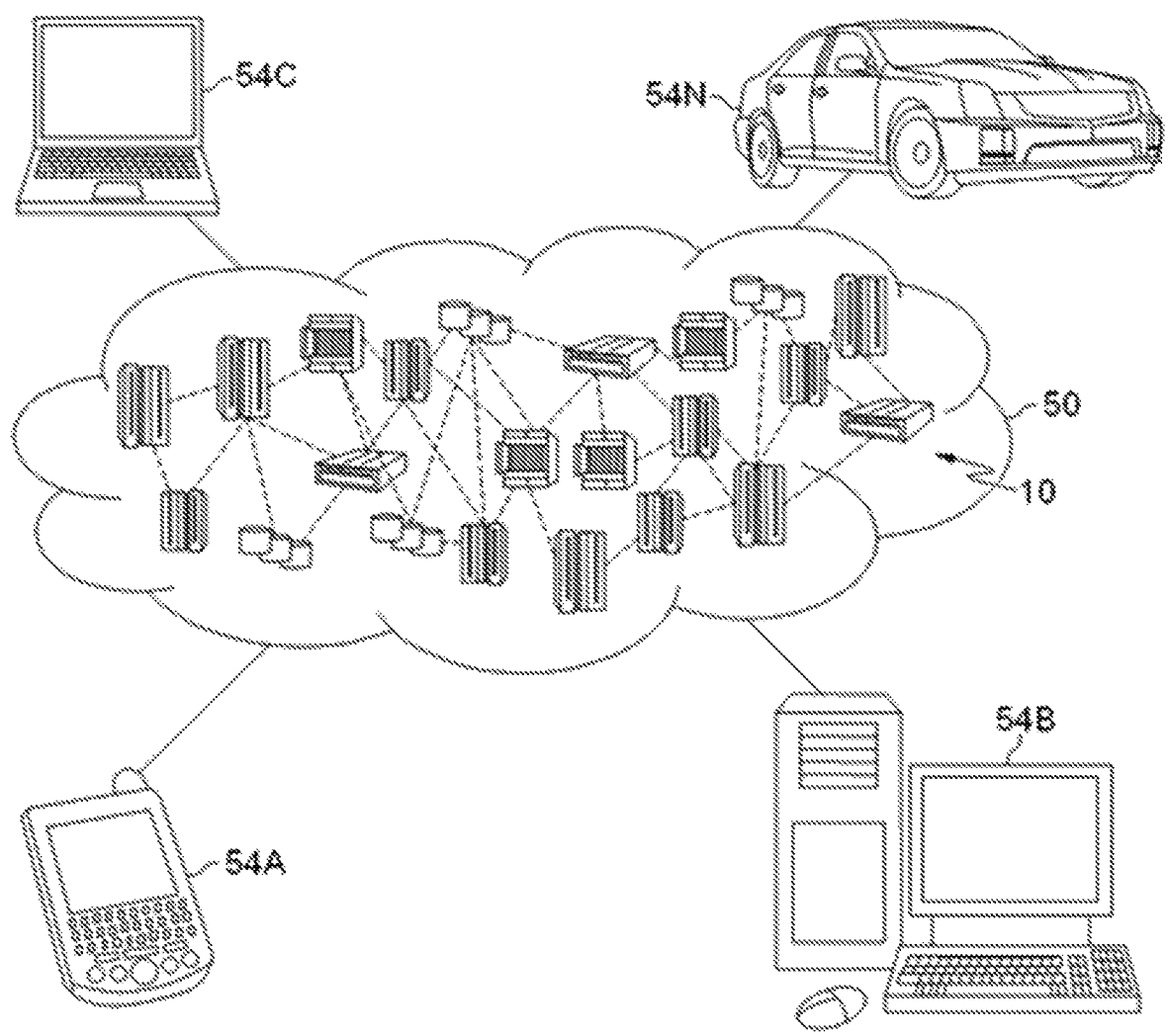
FIG. 2 depicts a cloud computing environment, in accordance with an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
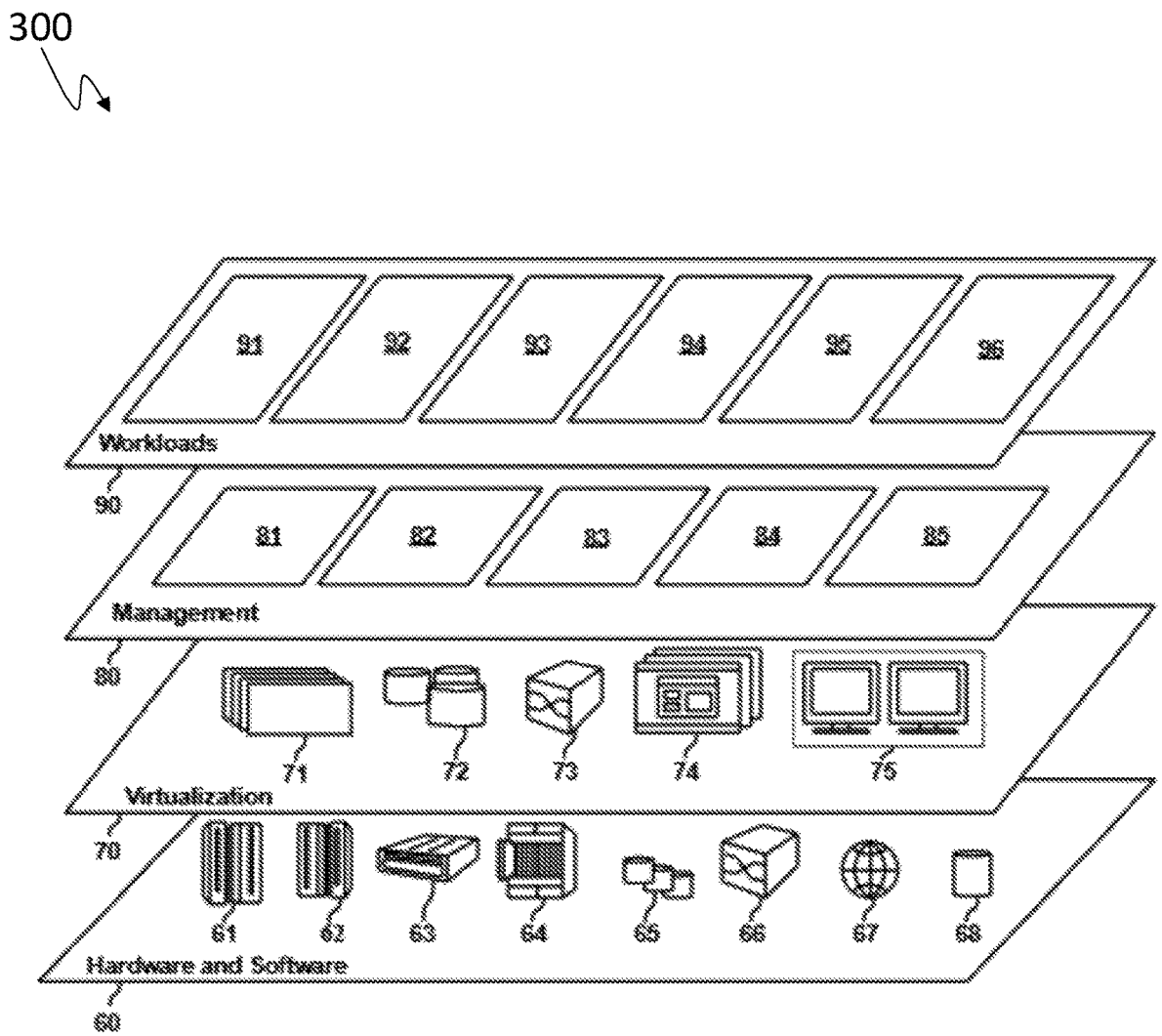
FIG. 3 depicts abstraction model layers, in accordance with an embodiment of the present invention.

Referring now to FIG. 3, a set of functional abstraction layers 300 provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and animation effect reproduction 96. The functionalities of animation effect reproduction 96 will be described in the following embodiment of the present disclosure.

Some video editing tools provide a facility for a user to create custom animation effects on an object. Creation of animation effects may be difficult and time consuming. If a user of existing video editing tools sees animation effects in some videos and desires to apply the same animation effects on target objects in other videos, the user may need to recreate the animation effects with respect to the target objects. Non-trivial interactions and skills are often required to operate the editing tools which may be difficult and time consuming. Sometimes, the users may not be aware of the exact operations to recreate complicated animation effects. Currently, there is no easy and convenient way to reproduce the same animation effects from a first video to other, different videos.

According to example embodiments of the present invention, there is proposed a solution for animation effect reproduction. In the solution, for one or more source objects identified from a source video, attribute information of the source object(s) is determined from respective frames in which the source object(s) is presented, the attribute information used to represent an animation effect associated with the source object(s).

The attribute information is provided for use in reproducing the animation effect in another video, referred to as a target video. Specifically, the attribute information of a specific source object can be applied on a target object in a sequence of target frames. The sequence of target frames is thus modified to generate a target video with the animation effect on the target object using the attribute information from the source object.

Through this solution, the animation effect can be copied from one video into other videos, which can greatly save users' efforts and improve the productivity of generating a new video. It is applicable for users to flexibly define and reproduce any animation effects presented in existing videos, which provide less restrictions and more freedom for the users in authoring videos. Embodiments of the present invention provide a mechanism for obtaining permissioned access to the existing videos in or to make these alterations and/or transmit a notification to the associated authors of said videos when content is being accessed.

Other advantages of the present disclosure will be described with reference to the example embodiments and the accompanying drawings below.

Figure 4:
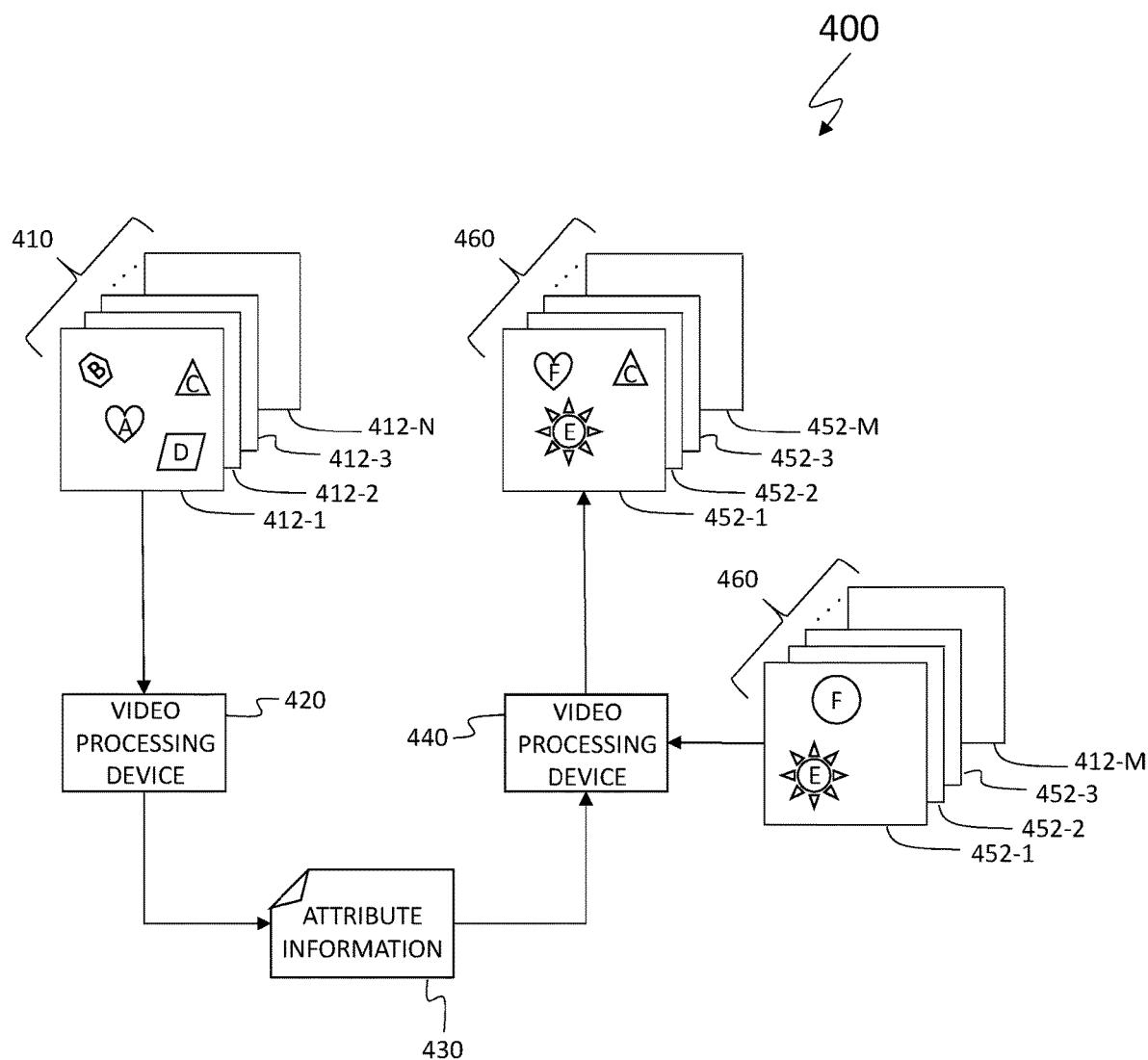
FIG. 4 depicts a block diagram of a system for animation effect reproduction, in accordance with an embodiment of the present invention.

Reference is now made to FIG. 4, which illustrates a block diagram of a system 400 for animation effect reproduction, according to some embodiments of the present invention. The system 400 is comprised of video processing device 420 for decomposing one or more animation effects associated with one or more source objects presented in source video 410.

Source video 410 may be formatted to include source frames 412-1, 412-2, 412-3, . . . , 412-N, where N is an integer larger than one. For ease of discussion, the source frames 412-1, 412-2, 412-3, . . . , 412-N are collectively or individually referred to as source frames 412. Typically, frames of a video are recorded at regular intervals. Each source frame may be composed of a number of pixels and corresponds to a static image. As used herein, a frame may also be referred to as a video frame, an image frame, or a static image in a video.

In embodiments of the present invention, video processing device 420 decomposes one or more animation effects associated with one or more source objects in source video 410 into attribute information 430. Attribute information 430 can be provided to video processing device 440 included in system 400. Video processing device 440 is configured to reproduce the same animation effect(s) on one or more target objects in target video 460. More specifically, the video processing device 440 utilizes attribute information 430 to modify a sequence of target frames 452-1, 452-2, 452-3, . . . , 452-M (collectively or individually referred to as target frames 452), where M is an integer larger than one. The sequence of target frames 452 may be extracted from a video or may be a series of duplicates of one or more static images. The sequence of target frames 452 are modified using attribute information 430 from source video 410 and are then composed into the target video 460, in which the target object(s) can be displayed with the corresponding animation effect(s).

As used herein, objects may include text, graphics, charts, character elements, and/or any other visual elements presented in frames or images. As used herein, the term "animation effect" refers to various effects to modify objects in an animated fashion. The modifying may include various operations, such as position moving, orientation changing, color or emphasis changing, shape changing, size changing, sub-object adding, and/or the like.

In system 400, video processing device 420 and video processing device 440 can communicate with each other via a wireless and/or wired network(s), such as the Internet. In some embodiments, video processing device 420 and/or video processing device 440 may be implemented by computer system/server 12 of FIG. 1. Video processing device 420 and video processing device 440 may be installed with one or more video editing tools or applications to implement the functionality of video processing disclosed in some embodiments of the present invention.

It should be appreciated that the elements and the arrangements shown in FIG. 4 are provided for the purpose of illustration only. Although shown as separate devices, in other embodiments, the functionalities of video processing device 420 and video processing device 440 described herein can be implemented in the same device.

It should also be appreciated that certain aspects of the present invention may be applied to various types of video including, for example, video formatted files, sequences of images (e.g., stored as a single file), animated Graphics Interchange Format (GIF) files, or the like.

Figure 5:
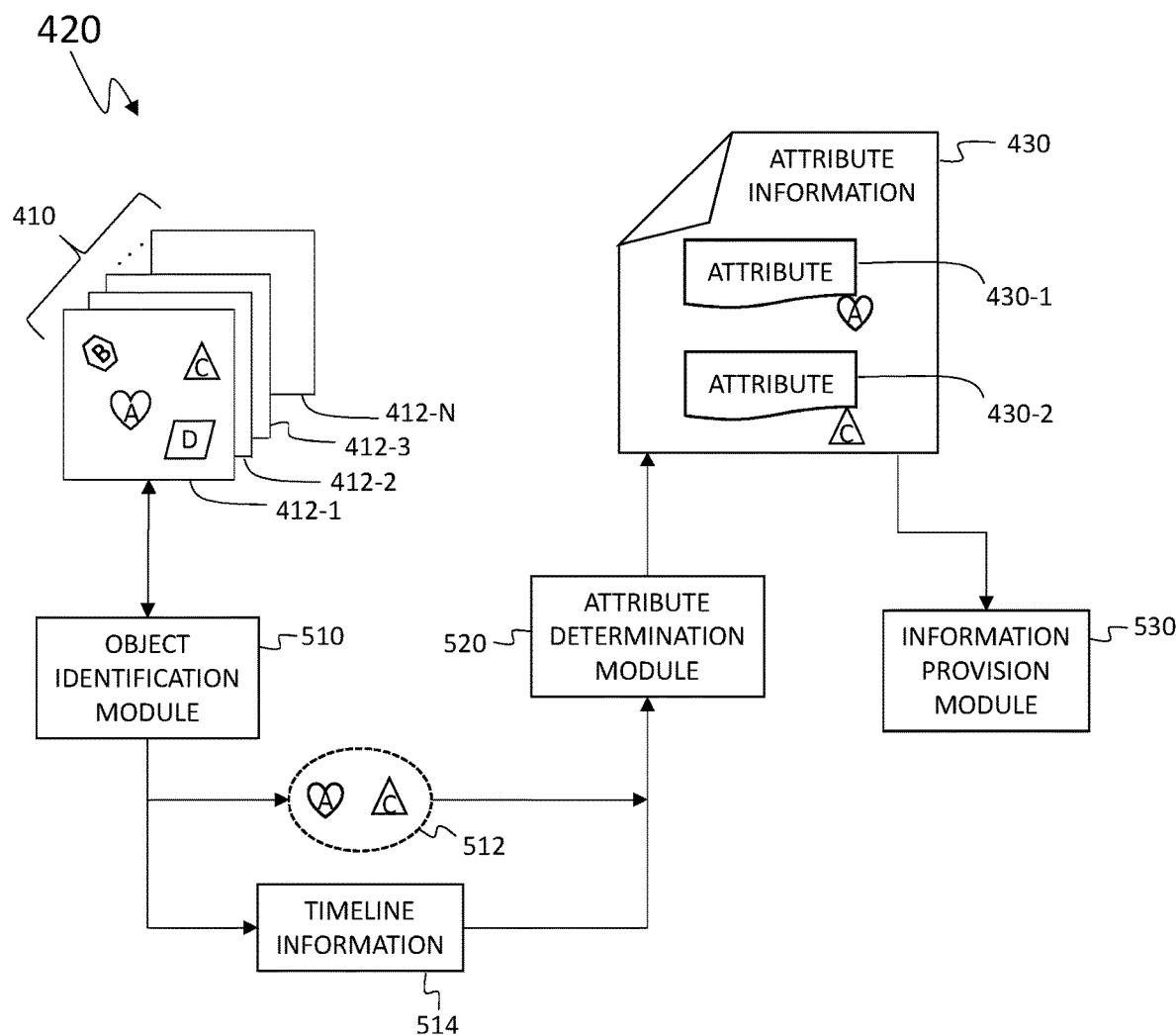
FIG. 5 depicts a block diagram of a video processing device in the system of FIG. 4, in accordance with an embodiment of the present invention.
Figure 6:
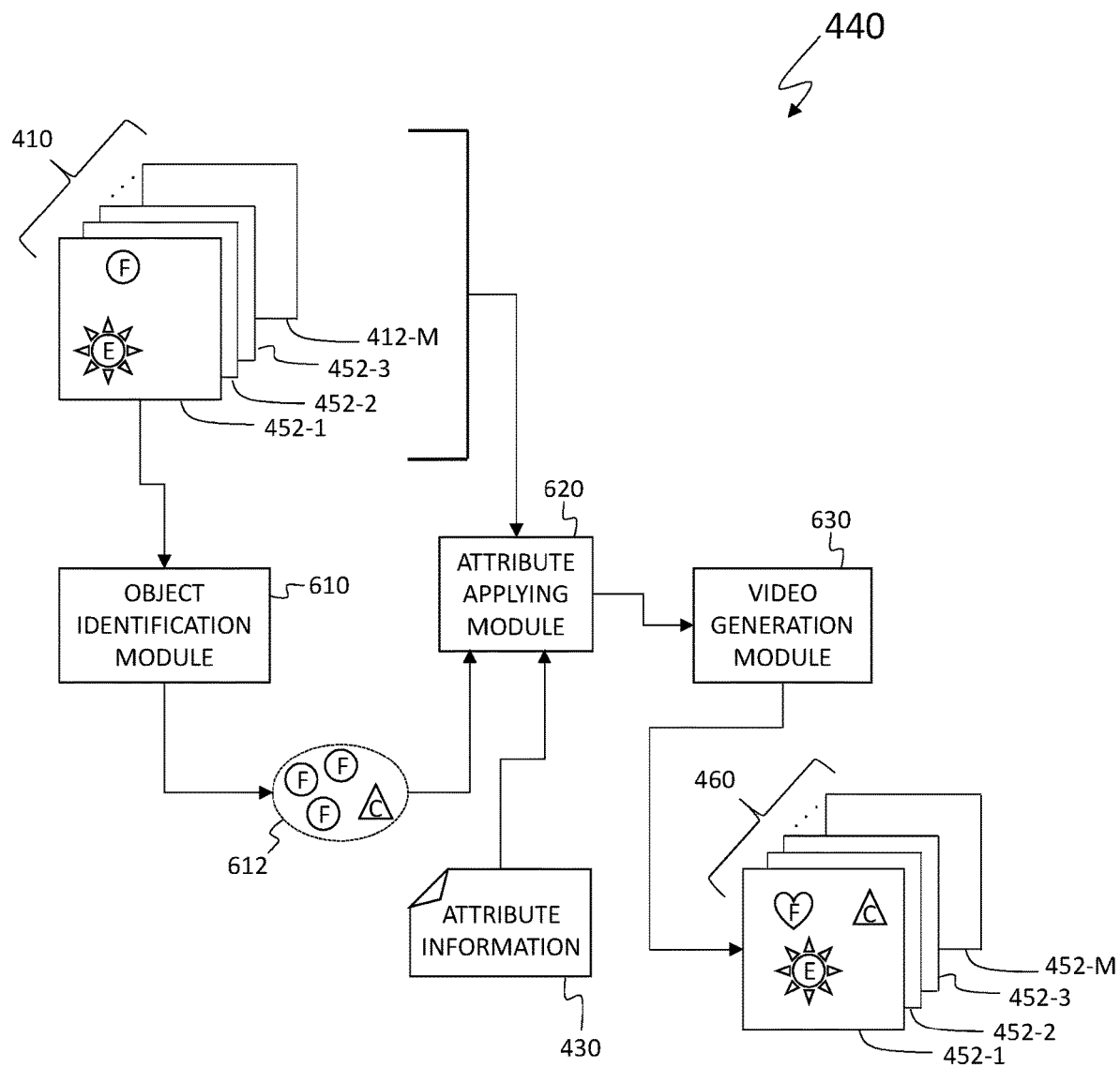
FIG. 6 depicts a block diagram of another video processing device in the system of FIG. 4, in accordance with an embodiment of the present invention.

Reference will now be made to FIGS. 5 and 6 to discuss detailed operations implemented at video processing device 420 and video processing device 440, respectively, in order to better understand the decomposition of an animation effect from a source video and the reproduction of the animation effect in a target video.

FIG. 5 depicts a block diagram of video processing device 420 in the system of FIG. 4 according to some embodiments of the present invention. As shown, video processing device 420 is comprised of object identification module 510 which is configured to identify one or more source objects 512 from source video 410. Source video 410 may be retrieved from any number of sources. In some embodiments, source video 410 may be uploaded or otherwise selected by a user.

Object identification module 510 may extract respective source frames 412 from source video 410 as static images and apply suitable object recognition methods to extract the one or more source objects 512. Source objects 512 may be the objects that have one or more associated animation effect(s) in source video 410. The background of source frames 412, for example, may not be identified as a source object.

In some embodiments, object identification module 510 may identify all source objects 512 having animation effects from the respective source frames 412 of source video 410. In some embodiments, object identification module 510 may identify one or more source objects 512 that are specified by the user or determined to be objects of interest to the user. In the example shown, among objects represented by "A," "B," "C," and "D" that are presented in source frame 412-1, objects 512 represented by "A" and "C" are identified. It is noted that although not specifically illustrated, other source frames 412 in source video 410 may include other objects, which may or may not be identified as discussed above.

Object identification module 510 may also record timeline information 514 of source object(s) 512 in source video 410. Timeline information 514 may indicate the timing of each source object 512 appearing in source frames 412. In some embodiments, for each source object 512, the associated timeline information 514 may be represented by sequence numbers of the frames in which each source object 512 appears. Other types of timing information are also possible. In some cases, object identification module 510 may perform the object identification on the respective source frames 412 to identify one or more source objects 512 in each source frame 412, and then group the same source objects using information provided by timeline information 514.

Different source objects 512 may appear in source video 410 for different time durations. Further, as animation is a temporally continuous phenomenon, an animation effect associated with an individual source object 512 may last for a certain time duration in source video 410. Thus, each source object 512 may be identified from a certain number of source frames 412 in source video 410.

Video processing device 420 includes attribute determination module 520 which is configured to determine attribute information 430 of each concerned source object 512 in respective source frames 412. For example, attribute information 430 includes attribute information 430-1 for the object represented by "A" and attribute information 430-2 for the object represented by "C" in the shown example.

Attribute information 430 can represent an animation effect associated with each source object 512 across the sequence of source frames 412. Depending on the design of the animation effect, the attribute information may indicate one or more visual attributes of each source object 512 in the respective source frames 412, including one or more of the following: shapes, sizes, colors, locations, orientations, or numbers of duplicates of each source object 512. Attribute information 430 may include any other visual attributes that may affect the animation effect associated with source object 512. Attribute determination module 520 may analyze a sequence of source frames 412 to determine the visual attributes of each source object 512 in each frame of the sequence of source frames 412.

In some embodiments, a plurality of possible source objects 512 may be identified by object identification module 510 from source video 410. The user may be allowed to specify, through a user selection, one of source objects 512 which has a desired animation effect. The sequence of source frames 412 from which attribute information 430 is determined may also be specified by the user, for example, through a user selection. As a specific example, a user selection may be received to indicate a time interval of source video 410. Attribute determination module 520 may determine the sequence of source frames 412 bounded by the selected time interval and determine attribute information 430 from this sequence of source frames 412. The time interval may be shorter than the actual time duration of the animation effect associated with the corresponding source object 512.

By specifying an individual source object 512 and the time interval, the user is able to copy any desired animation effect with any desired duration from source video 410. In some cases, in which no user selection is received, attribute determination module 520 may determine attribute information 430 by analyzing the sequence of source frames 412 that capture an entire duration of the associated animation effect of each source object 512.

Video processing device 420 further comprises information provision module 530 which is configured to provide attribute information 430 for use in reproducing the animation effect(s) in one or more other videos.

In some embodiments, as the timing characteristic is important for the animation effects, information provision module 530 may provide attribute information 430 in association with timeline information 514 of the sequence of source frames in source video 410. As such, attribute information 430, together with timeline information 514, may specifically indicate which attributes of an individual source object 512 are present at different time points (or in different frames).

In some embodiments, information provision module 530 may generate a file which includes attribute information 430 according to a predetermined format, and provide said file to other video processing devices. The predetermined format can ensure that video editing tools or video processing devices can parse the file to extract attribute information 430. The generated file may be referred to as a platform-independent file or tool-independent file. The predetermined format may include any commonly-used format in various video editing tools or video processing devices. As such, the animation effects in one video can be easily reproduced in other devices/platforms by distributing attribute information 430.

As attribute information 430 includes descriptive information, there are many formats applicable for generating the file of which includes attribute information 430. Some examples of the predetermined format include, but are not limited to, Extensive Markup Language (XML) or Java Script Object Notation (JSON). An example of the file that includes attribute information 430 of a specific source object 512 in a JSON format is provided as follows:

```
JSON format example:{
  "frame-seq-1":{
    "shape": "rectangle",
    "size":{"width":128, "height": 256},
    "color":{"mode":"RGB", "value":"AA88FF"},
    "location":{"x": 12, "y":50},
    "number":5
  },
  "frame-seq-2":{...}
  ...
}
```

In the above example, "frame-seq-1," "frame-seq-2," and the like indicate the sequence numbers of the frames from which visual attributes are detected. The visual attributes extracted from each source frame 412 may include the shape, the size, the color, the location, and the number of duplicates of the specific source object 512. It would be appreciated that the above file is merely provided for the purpose of illustration, without suggesting any limitation to the present disclosure. Attribute information 430 related to different source objects 512 may be contained in a single file or in separate files.

FIG. 6 depicts a block diagram of video processing device 440 in system 400 of FIG. 4, according to some embodiments of the present disclosure. Attribute information 430 may be provided to video processing device 440 for further use. Video processing device 440 is configured to reproduce, based on attribute information 430, an animation effect associated with a source object 512 in a target video that is being produced.

As shown, video processing device 440 comprises object identification module 610 which is configured to identify one of target object 612 from the sequence of target frames 452. Target object 612 is the one on which the animation effect associated with a source object is to be applied. For example, among objects represented by "E" and "F" that are presented in target frames 452, object 612 represented by "F" is identified. It is noted that although not specifically illustrated, other target frames 452 in the sequence may include other objects, which may or may not be identified.

In some embodiments, the object identification may not be needed on the sequence of target frames 452. The target object may be duplicated from a source object 512 presented in the source video 410, more specifically, an individual source object 612 whose animation effect has been decomposed in attribution information 430. For example, the object "C" in source video 410 is determined as target object 612.

Target object 612 may be specified by the user, either from the objects presented in target frames 452 or from source object(s) 512 in FIG. 5. In some examples, a plurality of possible objects may be identified from target frames 452 or a plurality of source objects 512. The user may be allowed to specify, through a user selection, one or more of the objects to animate.

The sequence of target frames 452, as mentioned above, may be extracted from a video, or may be a series of duplicates of one or more static images. The video or the static image(s) may be uploaded or otherwise selected by the user. In the case of the video, some or all of the frames of the video may be extracted as static images for processing. In the case that a static image(s) is provided, each static image may be duplicated for a number of times to obtain the sequence of target frames 452, in order to finally convert the static image(s) into a video. The number of duplications may be specified by the user or may depend on the duration of the animation effect to be applied.

Video processing device 440 includes attribute applying module 620 which is configured to modify the sequence of target frames 452 by applying attribute information 430 on target object 612 in the sequence of target frames 452. In this way, the animation effect can be reproduced on target object 612 across the sequence of target frames 452. If attribute information 430 includes information related to attributes of more than one source object 512 in FIG. 5, the visual attributes of one source object 512 selected by the user or otherwise specified may be applied onto target object 612 to change the visual attributes of target object 612. Attribute information 430 may be applied to target object 612 in the sequence of target frames 452 in an order specified by timeline information 514 in FIG. 5 related to the corresponding source object 512, to ensure the successful reproduction of the animation effect.

In some embodiments, if target object 612 is originally included in one or more of target frames 452, the visual attributes of source object 512 in FIG. 5 may be applied to target object 612 across the sequence of target frames 452. If target object 612 is duplicated from source object 512, it may be rendered to target frames 452 with attribute information 430 remaining the same as in source video 410 in FIG. 5. The start frame of the rendering may be specified by the user or otherwise configured. The relative positioning of target object 612 rendered to target frames 452 may also be specified by the user or otherwise configured.

While applying attribute information 430, the user is able to adjust one or more aspects of the animation effect applied to target object 612, including, for example, the duration, change rate, or relative positioning of the animation effect. Such changes are dependent on actual design requirements on the animation effect and the video.

After the sequence of target frames 452 are modified, video processing device 440 further includes video generation module 630 configured to generate target video 460 from the sequence of modified target frames 452. Video generation module 630 may generate a video file in any suitable format from the sequence of modified target frames 452.

In some embodiments, video generation module 630 may further add an audio effect for target object 612 and/or other objects presented in the sequence of modified target frames 452. In some embodiments, the audio effect for target object 612 may be obtained from an audio effect for the corresponding source object 512 in FIG. 5 in source video 410. Alternatively, the audio effect may be retrieved from other audio sources.

In some embodiments, more than one target object in the sequence of target frames 452 may be applied with respective animation effects according to attribute information 430. In the example shown in FIG. 6, the originally-presented object "F" in target frames 452 is modified to present an animation effect reproduced from, for example, the object "A" in source video 410 in FIG. 5. Additionally, the object "C" in source video 410 is rendered into target frames 452 together with its animation effect. In some embodiments, animation effects associated with source objects from different source videos can also be applied to create a target video, where each of the animation effects can be implemented in a similar way as described herein.

Figure 7:
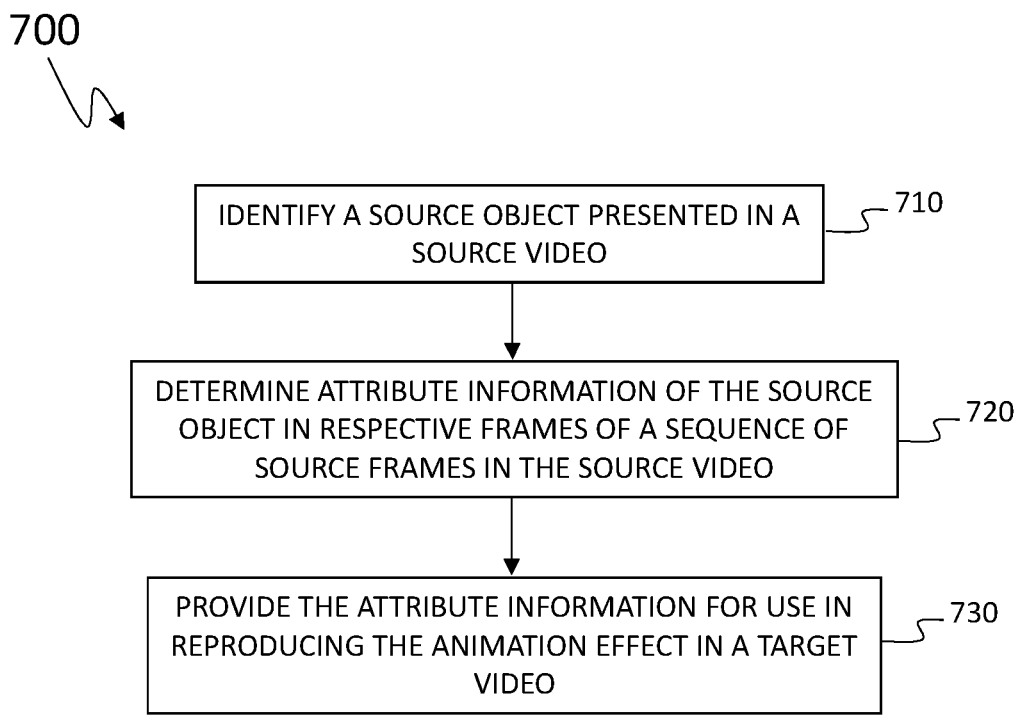
FIG. 7 depicts a flowchart of an example method, in accordance with an embodiment of the present invention.

FIG. 7 shows a flowchart of an example method 700 according to some embodiments of the present invention. Method 700 can be implemented at video processing device 420 shown in FIG. 4. For the purpose of discussion, method 700 will be described from the perspective of video processing device 420 with reference to FIG. 4.

At step 710, video processing device 420 identifies a source object presented in a source video. At step 720, video processing device 420 determines attribute information of the source object in respective frames of a sequence of source frames in the source video, the attribute information representing an animation effect associated with the source object across the sequence of source frames. At step 730, video processing device 420 provides the attribute information for use in reproducing the animation effect in a target video.

In some embodiments, providing the attribute information comprises generating a file which includes the attribute information according to a predetermined format; and providing the file to a user.

In some embodiments, the attribute information indicates at least one of shapes, sizes, colors, locations, orientations, or numbers of duplicates of the source object in the respective frames.

In some embodiments, method 700 further includes receiving a first user selection of the source object from a plurality of source objects presented in the source video. In some embodiments, the identifying at step 710 includes identifying the source object presented in the video source based on the first user selection.

In some embodiments, method 700 further comprises receiving a second user selection of a time interval to bound source frames of interest for the source object in the source video. In some embodiments, the determining at step 720 includes determining a sequence of source frames within the time interval in the source video and determining the attribute information of the source object in respective frames of the sequence of source frames.

In some embodiments, the providing the attribute information includes providing the attribute information in association with timeline information of the sequence of source frames in the source video.

Figure 8:
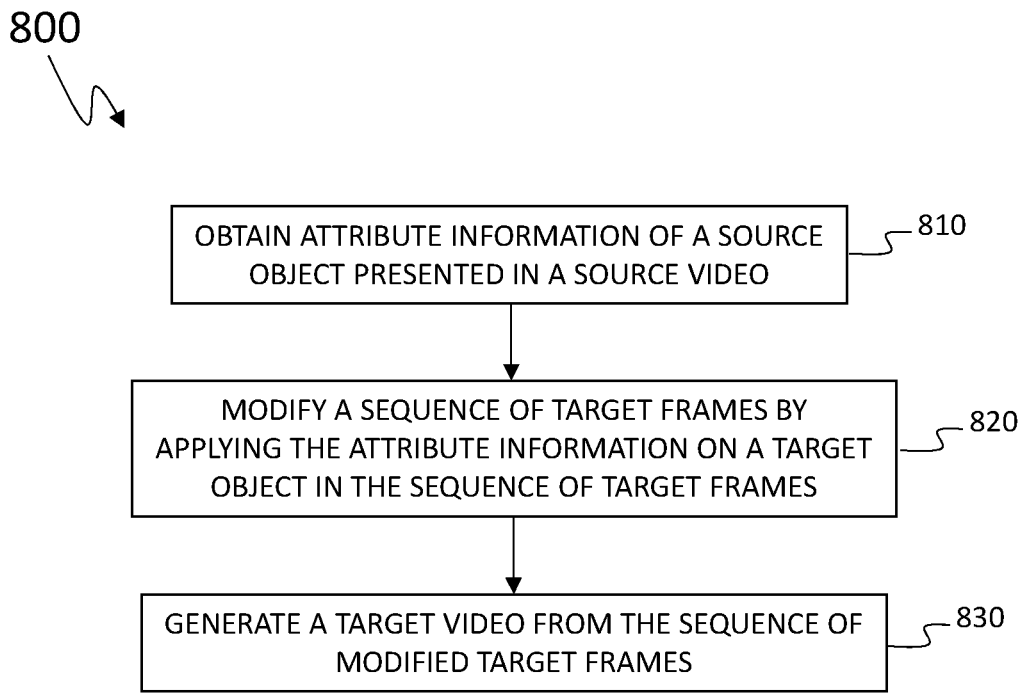
FIG. 8 depicts a flowchart of another example method, in accordance with an embodiment of the present invention.

FIG. 8 shows a flowchart of an example method 800 according to some embodiments of the present invention. Method 800 can be implemented at video processing device 420 as shown in FIG. 4. For the purpose of discussion, method 800 will be described from the perspective of video processing device 440 with reference to FIG. 4.

At step 810, video processing device 440 obtains attribute information of a source object presented in a source video, the attribute information representing an animation effect associated with the source object across a sequence of source frames of the source video. At step 820, video processing device 440 modifies a sequence of target frames by applying the attribute information on a target object in the sequence of target frames, to reproduce the animation effect on the target object across the sequence of target frames. At step 830, video processing device 440 generates a target video from the sequence of modified target frames.

In some embodiments, the obtaining the attribute information comprises retrieving a file comprising the attribute information, the file being generated according to a predetermined format; and parsing the attribute information from the received file.

In some embodiments, the target object is identified from at least one of the sequence of frames, or the target object is duplicated from the source object and added to the sequence of target frames.

In some embodiments, the sequence of target frames are extracted from a video, or the sequence of target frames comprises duplicates of a static image.

In some embodiments, the obtaining the attribute information comprises obtaining the attribute information in association with timeline information of the sequence of source frames in the source video.

In some embodiments, the modifying the sequence of target frames comprises applying the attribute information to the target object in the sequence of target frames in an order according to the timeline information.

It should be noted that the processing of animation effect reproduction, video processing device 420 and/or video processing device 440, according to embodiments of this invention, could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   in response to receiving a source video having unknown animation effects associated with a source object depicted in the received source video, copying, by one or more processors, the unknown animation effect of the source object by:
      identifying, by one or more processors, respective frames of a sequence in the source video containing the source object during a specified time interval, and
      determining, by one or more processors, attribute information of the source object depicted across the identified respective frames, wherein the attribute information represents an animation effect associated with the source object across the sequence in the source video;
   converting a static image into a new video by reproducing the animation effect associated with the source object to one or more new objects of the static image, wherein converting a static image into a new video comprises:
      creating, by one or more processors, a sequence of target frames comprising one or more duplicates of a target object, and
      modifying, by one or more processors, the sequence of target frames by reproducing the animation effect on respective duplicates of the target object across the sequence of target frames by applying the attribute information on at least the target object of the one or more new objects in the sequence of target frames.

2. The method of claim 1, wherein providing the attribute information comprises:
   generating, by one or more processors, a file which includes the attribute information according to a predetermined format; and
   providing, by one or more processors, the file including the attribute information to a user.

3. The method of claim 1, wherein the attribute information indicates at least one of shapes, sizes, colors, locations, orientations, or numbers of duplicates of the source object in the respective frames.

4. The method of claim 1, further comprising:
   receiving, by one or more processors, a first user selection of the source object from a plurality of source objects presented in the source video; and
   identifying, by one or more processors, the source object presented in the video source based on the first user selection.

5. The method of claim 1, further comprising:
   receiving, by one or more processors, a second user selection of a time interval to bound source frames of interest for the source object in the source video;
   determining, by one or more processors, the sequence of source frames within the time interval in the source video; and
   determining, by one or more processors, the attribute information of the source object in respective frames of the sequence of source frames.

6. The method of claim 1, wherein providing the attribute information comprises:
   providing, by one or more processors, the attribute information in association with timeline information of the sequence of source frames in the source video.

7. The method of claim 1, further comprising:
   obtaining, by one or more processors, attribute information of the source object presented in the source video, the attribute information representing the animation effect associated with the source object across the sequence of source frames of the source video;
   modifying, by one or more processors, a sequence of target frames by applying the attribute information on a target object in the sequence of target frames, to reproduce the animation effect on the target object across the sequence of target frames; and
   generating, by one or more processors, the target video from the modified sequence of target frames.

8. The method of claim 7, wherein obtaining the attribute information comprises:
   retrieving, by one or more processors, a file which includes the attribute information, the file being generated according to a predetermined format; and
   parsing, by one or more processors, the attribute information from the retrieved file.

9. The method of claim 7, wherein the target object is identified from the sequence of source frames, or the target object is duplicated from the source object and added to the sequence of target frames.

10. The method of claim 7, wherein the sequence of target frames are extracted from a video, or the sequence of target frames includes duplicates of a static image.

11. The method of claim 7, wherein obtaining the attribute information comprises:
   obtaining, by one or more processors, the attribute information in association with timeline information of the sequence of source frames in the source video.

12. The method of claim 11, wherein the modifying the sequence of target frames comprises:
   applying, by one or more processors, the attribute information to the target object in the sequence of target frames in an order according to the timeline information.

13. A computer program product comprising:
   one or more computer readable storage media; and program instructions stored on the one or more computer readable storage media, the program instructions comprising:
program instructions to, in response to receiving a source video having unknown animation effects associated with a source object depicted in the received source video, copy the unknown animation effect of the source object by:
program instructions to identify respective frames of a sequence in the source video containing the source object during a specified time interval, and
program instructions to determine attribute information of the source object depicted across the identified respective frames, wherein the attribute information represents an animation effect associated with the source object across the sequence in the source video;
program instructions to convert a static image into a new video by reproducing the animation effect associated with the source object to one or more new objects of the static image, wherein converting a static image into a new video comprises:
program instructions to create a sequence of target frames by duplicating a target object of the one or more new objects, and
program instructions to modify the sequence of target frames by reproducing the animation effect on respective duplicates of the target object across the sequence of target frames by applying the attribute information on at least the target object of the one or more new objects in the sequence of target frames.

14. The computer program product of claim 13, wherein the program instructions to obtain the attribute information comprise:
program instructions to retrieve a file comprising the attribute information, the file being generated according to a predetermined format; and
program instructions to parse the attribute information from the retrieved file.

15. The computer program product of claim 13, wherein the target object is identified from the sequence of frames, or the target object is duplicated from the source object and added to the sequence of target frames.

16. The computer program product of claim 13, wherein the sequence of target frames are extracted from a video, or the sequence of target frames includes duplicates of a static image.

17. The computer program product of claim 13, wherein the program instructions to obtain the attribute information comprise:
program instructions to obtain the attribute information in association with timeline information of the sequence of source frames in the source video.

18. The computer program product of claim 17, wherein the program instructions to modify the sequence of target frames comprise:
program instructions to apply the attribute information to the target object in the sequence of target frames in an order according to the timeline information.

19. A computer system comprising:
one or more computer processors;
one or more computer readable storage media; and
program instructions stored on the one or more computer readable storage media for execution by at least one of the one or more computer processors, the program instructions comprising:
program instructions to, in response to receiving a source video having unknown animation effects associated with a source object depicted in the received source video, copy the unknown animation effect of the source object by:
program instructions to identify respective frames of a sequence in the source video containing the source object during a specified time interval, and
program instructions to determine attribute information of the source object depicted across the identified respective frames, wherein the attribute information represents an animation effect associated with the source object across the sequence in the source video; and
program instructions to convert a static image into a non static image by reproducing the animation effect associated with the source object to one or more new objects of the static image, wherein the program instructions to convert a static image into a non static image comprise:
program instructions to create a sequence of target frames by duplicating a target object of the one or more new objects, and
program instructions to modify the sequence of target frames by reproducing the animation effect on the target object across the sequence of target frames by applying the attribute information on at least the target object of the one or more new objects in the sequence of target frames.

20. The computer system of claim 19, wherein the program instructions to provide the attribute information comprise:
program instructions to generate a file to comprise the attribute information according to a predetermined format; and
program instructions to provide the file comprising the attribute information.

* * * * *